Dec. 10, 1940.  J. YATES  2,224,753
TEA OR COFFEE BAG AND METHOD OF MAKING THE SAME
Filed Sept. 16, 1938
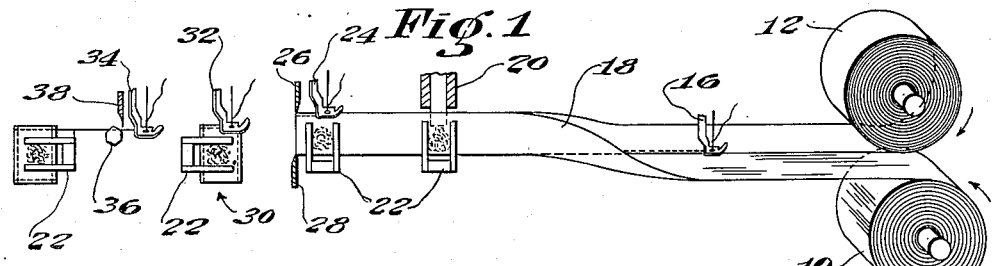
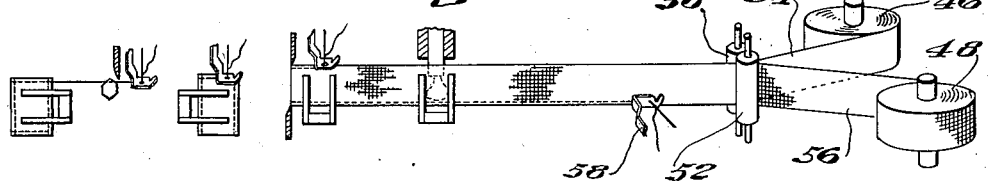
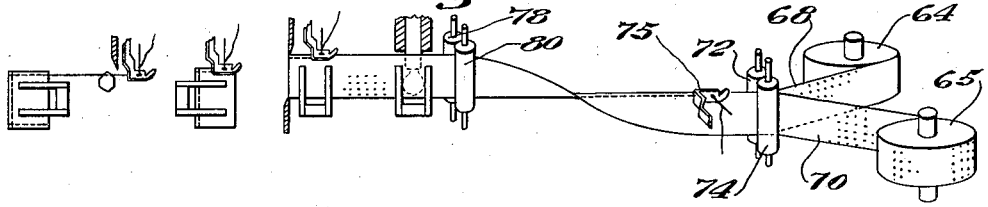
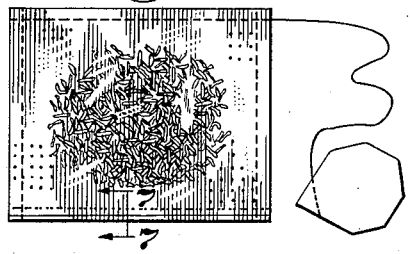
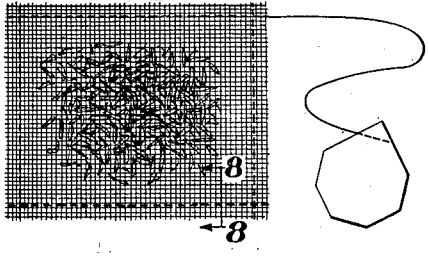
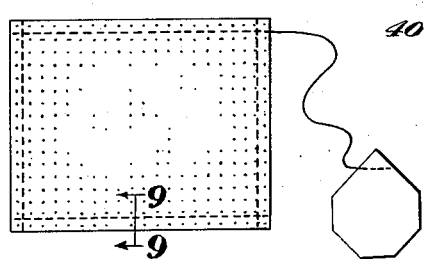
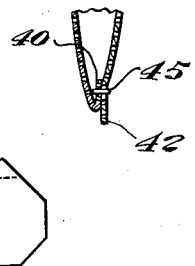
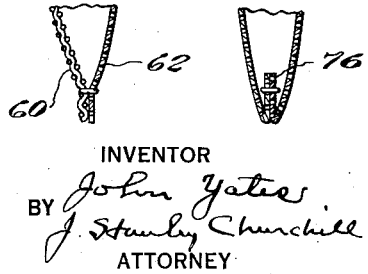
INVENTOR
John Yates
BY J. Stanley Churchill
ATTORNEY Patented Dec. 10, 1940

2,224,753

UNITED STATES PATENT OFFICE 2,224,753

TEA OR COFFEE BAG AND METHOD OF MAKING THE SAME

John Yates, Quincy, Mass., assignor to Pneumatic Scale Corporation, Limited, Quincy, Mass., a corporation of Massachusetts Application September 16, 1938, Serial No. 230,243

4 Claims. (Cl. 226—53)

This invention relates to a tea or coffee bag and to a method of making the same.

One object of the invention is to provide a novel tea or coffee bag of a novel construction which enables the bag to be produced in an economical manner without detracting from the efficiency of the bag for its intended purpose.

A further object of the invention is to provide a novel and practical method for the manufacture of the present improved tea or coffee bag.

With these general objects in view, and such others as may hereinafter appear, the invention consists in the package and in the method of making the same hereinafter described and particularly defined in the claims at the end of this specification.

In the drawing, Figs. 1, 2 and 3 are diagrammatic views partly in perspective and partly in side elevation, illustrating different methods of combining the two different materials forming the body of the bag; Figs. 4, 5 and 6 are views of the bag constructed according to the present method illustrating a few of the various combinations of materials which may be used in practicing the present invention; and Figs. 7, 8 and 9 are cross-sectional details of portions of the containers illustrated, the sections being taken on the lines 7—7; 8—8 and 9—9 of Figs. 4, 5 and 6 respectively.

In general, the present novel tea or coffee bag comprises a container having two separate half sections secured together to enclose a quantity of the tea or coffee therein. One of the half sections of the bag is composed of a material of a stiffer and more self-supporting nature than the material of which the second half section is preferably composed and the two half sections, when secured together, form a container wherein the stiffer half section serves as a support for the less substantial material of the second half section while the latter enables economies to be secured in the ultimate cost of manufacture of the completed tea or coffee bag. Prior to the present invention, commercial tea or coffee bags have been composed of self-supporting materials such as a fine gauze, better grades of parchment paper, Cellophane and the like and the cost of such materials has contributed substantially to the ultimate cost of the completed tea or coffee bag. Attempts to produce satisfactory tea or coffee bags utilizing the more inexpensive and less substantial materials, as the cheaper grades of parchment paper, the coarser meshes of gauze and the like have been unsuccessful, principally because of the difficulty experienced in securing together the marginal portions of the bag.

In practice, in accordance with the present invention, the bag is composed of two sections secured together by stitching or otherwise and one of the sections may be composed of a relatively substantial and self-supporting material such as the better grades of parchment paper or the better grades of gauze and the second section of the bag may be formed of the more inexpensive and less substantial materials.

Referring now to the accompanying drawing, Fig. 1 represents one method of combining two different materials to form a continuous web for the production of tea bags. By way of example, the materials combined are herein illustrated as a lower roll 10 of perforated high grade "Cellophane" and an upper roll 12 disposed in overlapping relation to the lower roll along one edge thereof and comprising a less expensive and weaker "Cellophane." The overlapping adjacent edges of the materials may then be stitched together by any usual or preferred form of sewing unit indicated diagrammatically at 16. The sides of the web may then be folded longitudinally as indicated generally at 18 to form the two walls of the bag. As the longitudinal strip is fed forwardly, separate charges of the commodity are deposited between the folds of the web by a suitable filling unit indicated generally at 20. The web may be gripped and advanced by the continuously travelling gripper units 22 which close upon the folded strip at points in advance of and behind the charge of tea therein. The web then may be passed by a second stitching unit 24 which closes the upper open edge of the strip by stitching together the free upper longitudinal edges thereof. While the strip in process of being sewed is advancing continuously, the knives 26, 28 operate upon the travelling strip at points midway between adjacent gripper units and sever the strip into bag sections each containing a charge of the commodity being packaged and held by a gripper unit. As the gripper units continue their advance, they are successively rotated through a quarter revolution, as illustrated diagrammatically at 30 thus bringing the bag sections into position to bring one of the severed edges uppermost where it may enter a third stitching mechanism 32.

The further advance of the gripper units 22 causes the grippers thereof to rotate successively through two quarter revolutions thus bringing the other end or severed edge of the bag section in uppermost position and in line with the stitching mechanism of the fourth sewing unit 34. At this point in the process of producing the bag a tag 36 may be carried through the stitching mechanism of this unit so that the continuation of the stitching will cause the tag to be stitched across one edge. A suitable knife 38 may be provided to sever the thread after the tag has been attached.

Any of the usual tea bagging machines now upon the market for forming a pillow type tea container may be adapted to practice the above described method of producing a package in accordance with the present invention and except as to the manner of combining two different materials to form the container, the invention may be practiced upon a machine of the type illustrated in the United States patent to John T. Dalton, No. 1,688,268, issued October 16, 1928, to which reference may be had for more complete and further details.

The completed bag thus produced according to the above described method is illustrated in Figs. 4 and 7, the materials from which the bag is constructed being shown therein by way of example as Cellophane on one side and perforated parchment paper or a different grade of Cellophane on the other side. As clearly shown in Fig. 7, the overlapping lower edges 40, 42 are joined together by the stitching 45.

A modified method of joining two different materials is illustrated in Fig. 2, wherein the two rolls of different material 46, 48 are supported vertically and the strips 54, 56 are brought together between guide rollers 50, 52. The longitudinal edges of the strips 54, 56 are then stitched together by the sewing unit indicated at 58. The bag may then be completed in a manner similar to that described in connection with Fig. 1, the completed container being shown in Figs. 5 and 8. By way of example the materials used in this instance are a textile fabric 60 on one side and either Cellophane or parchment paper 62 on the other.

Another modification of the invention is illustrated in Figs. 3, 6 and 9 showing the two different materials such as two different grades of parchment paper being fed from vertically mounted rolls 64, 65. The strips 68, 70 are guided between rollers 72, 74 and joined together at their upper longitudinal edges by the sewing unit 75. The web thus formed is turned back upon itself, being folded to confine the stitched lower edge within the bag as shown at 76 in Fig. 9. The folded web thus formed is then guided to the feeding unit and the stitching machine between rollers 78, 80 to be completed as hereinbefore described.

From the above description and by reference to the drawing, it will be observed that the present construction of the bag enables an efficient container of the envelope type to be produced with two different materials by making one side of the bag of sufficiently stable material to support the opposite side during the stitching operation thus enabling a variety of materials to be used which formerly could not be used because of their inability to withstand the stitching operation. As a result a great economy is effected in the production of the container.

While the invention has been illustrated and described as embodied in a package of the so-called "pillow" type of tea bag and of specific materials, it will be understood that other forms of containers and other materials may be used if desired.

Having thus described the invention, what is claimed is:

1. The method of making a tea or coffee bag comprising stitching together two webs of different bag forming materials to form a composite web, one web being substantially stronger and more stable than the other and adapted to constitute a support for the other in the completed bag, then folding the composite web lengthwise thereof substantially along the line of jointure of the different materials, advancing the composite web, depositing charges between the folded sides of the composite web at intervals in its length and then securing together the sides of the composite web to form bag sections and subsequently severing the bag sections to form individual filled tea or coffee bags.

2. The method of making a tea or coffee bag comprising stitching together two strips of different materials along adjacent longitudinal edges to form a web, one web being substantially stronger and more stable than the other and adapted to constitute a support for the other, folding the web along the longitudinal line joining the different materials, advancing said web, depositing charges of a commodity between the folded sides of the web at intervals in its length, confining said charges to the areas of the web onto which they are deposited, sewing together the longitudinal free edges of the web, severing the web into bag sections, and sewing successively the transverse severed edges of each bag section.

3. The method of making a tea or coffee bag comprising first joining together adjacent longitudinal edges of two strips of bag forming material to provide a composite web, one of said strips being substantially stronger and more stable than the other and adapted to constitute a support for the other, and at least one of said strips being formed so that water may pass therethrough; folding the composite web longitudinally substantially along the line of jointure of the strips; inserting charges of tea or coffee transversely between the sides of the composite web; securing the sides of the composite web together to form a series of filled bag sections; and then severing the composite web to form individual filled bag sections.

4. A method of making a tea or coffee bag comprising joining together the longitudinal edges of two strips of material of substantially equal width to form a relatively wide composite web, one of said strips being substantially stronger and more stable than the other and adapted to constitute a support for the other and at least one of said strips being formed so that water may pass therethrough; folding said composite web lengthwise on a line substantially medial of the side edges thereof; inserting charges of tea or coffee transversely between the sides of the composite web; and securing the sides of the composite web together to form a series of filled bags.

JOHN YATES.